United States Patent

Leitel

Patent Number: 6,061,491
Date of Patent: May 9, 2000

[54] FIBER-OPTIC ARRANGEMENT FOR ADDITIVE MIXING OF A PLURALITY OF LIGHT BUNDLES

[75] Inventor: Armin Leitel, Jena, Germany

[73] Assignee: Carl Zeiss Jena GmbH, Jena, Germany

[21] Appl. No.: 09/030,497

[22] Filed: Feb. 25, 1998

[30] Foreign Application Priority Data

Mar. 1, 1997 [DE] Germany .......................... 197 08 420

[51] Int. Cl.$^7$ ..................................................... G02B 6/22
[52] U.S. Cl. ............................................ 385/126; 385/121
[58] Field of Search .................................... 385/126, 114, 385/115, 116, 120, 121

[56] References Cited

U.S. PATENT DOCUMENTS 3,498,864  3/1970  Ogle ......................................... 385/121
5,585,735  12/1996  Takahashi et al. ....................... 385/126

FOREIGN PATENT DOCUMENTS 52-40146  3/1977  Japan ...................................... 385/121
2-54204   2/1990  Japan ...................................... 385/121

*Primary Examiner*—Hung N. Ngo
*Attorney, Agent, or Firm*—McAulay Nissen Goldberg Kiel & Hand, LLP

[57] ABSTRACT

A fiber-optic arrangement for additive mixing of a plurality of light bundles comprises individual light-conducting cores for guiding laser light bundles independently and separately from one another, wherein each of the cores has a light entry location and a light exit location. The light-conducting cores are enclosed by a common cladding and are arranged so as to run alongside one another within said cladding. Propagation directions of the light bundles are identical in all cores. Light exit locations of all cores are arranged in a common plane oriented at a right angle to the propagation direction. The lateral distance between every two cores at the light exit locations are smaller than the lateral distance between the same cores at the light entry locations.

6 Claims, 2 Drawing Sheets

FIBER-OPTIC ARRANGEMENT FOR ADDITIVE MIXING OF A PLURALITY OF LIGHT BUNDLES

BACKGROUND OF THE INVENTION a) Field of the Invention

The invention is directed to a fiber-optic arrangement for additive mixing of a plurality of light bundles, especially laser light bundles which are guided independent and separate from one another in individual light-conducting cores, wherein each of the cores has a light entry location and a light exit location.

b) Field of the Related Art

For the reproduction of image information, especially in the entertainment and information fields, image generation devices in which light effects or images are generated on the basis of the useful radiation of lasers are being used to an increasing extent. This applies to installations provided for use in the open air as well as in enclosed spaces. A first generation of laser televisions is being developed in which the picture is displayed with the use of laser radiation.

In the above-mentioned new applications of laser technology in which the useful radiation of a laser lies in the visible spectrum and average outputs of several watts are required, there is a need for new safety devices for the prevention of personal injury. A primary danger consists in direct exposure of persons to laser radiation either through inattention or when the laser beam is unintentionally pointed directly at a person, e.g., due to malfunction of the image generation device. Therefore, safety regulations require that the laser light which may be hazardous to health is guided in waveguides. Light waveguides for laser radiation are known in the art.

On the other hand, available radiation sources have not yet achieved the light output required for desirable picture quality, especially in the reproduction of images on large displays. However, the light waveguides known in the art are not suitable for increasing put, in particular for laser radiation.

DE-OS 28 53 800 describes a directional coupler for partial or complete coupling of a light radiated into the core of a light waveguide over to the core of a second light waveguide. The cores which are embedded in a medium having a smaller index of refraction than that of the cores extend along a coupling path parallel to one another so as to practically contact one another. Along the coupling path, which has a length of 1 to 2 cm, the light waveguides are fixed in separate holders which can be displaced relative to one another and a displacing device having a forward feed which can be preset for adaptation of a splitting ratio is arranged at the holders.

This involves a so-called surface coupler for signal splitting over the cladding surfaces of the fibers in question. The two cores of the fibers are fused together at the surface along their line of contact which is roughly one to two centimeters long. In this fused area, entering light passes from one fiber into the other. This arrangement is suitable for coupling radiation with different optical information, but not for adding radiation outputs.

OBJECT AND SUMMARY OF THE INVENTION

The primary object of the invention is to provide a fiber-optic arrangement of the type mentioned above by which the beam cross sections of individual, locally separated light sources can be combined into a unified beam cross section.

According to the invention, this object is met in that the light-conducting cores are enclosed by a common cladding and are arranged so as to run alongside one another within this cladding, in that the propagation directions of the light bundles are identical in all cores, in that the light exit locations of all cores are arranged in a common plane oriented at a right angle to the propagation direction, and in that the lateral distance between every two cores at the light exit locations is smaller than the lateral distance between the same cores at the light entry locations. With this arrangement, it is possible in an advantageous manner to guide together the radiation emitted from different independent light sources to an exit location and thus to concentrate a high radiation output on a relatively small radiating surface. In order to achieve this, the light from a source is coupled into every light-conducting core of the fiber-optic arrangement according to the invention and is transmitted over the respective core to the light exit location. The beam intensity or radiation intensity at the light exit location of the fiber-optic arrangement can be advantageously varied in that the radiation sources associated with the individual light-conducting cores are switched on or off individually. The minimum radiation at the light exit location is available when only the light of one radiation source is coupled into a core associated with this radiation source; the maximum radiation output is achieved when the light entry location of every core is connected with a light source. In particular, in connection with laser radiation, the fiber-optic arrangement according to the invention can serve to join the individual bundles of laser beams at the light outlet surface for the reproduction of image information on large displays, to achieve a higher light output by means of joining the light bundles in this way, and accordingly to enable the operation of displays having larger dimensions. In this type of joining of light sources, in contrast to known integrated optical solutions, lower light losses occur by coupling in and coupling out the radiation via one or more lens systems. This solution also dispenses with the adjustment or alignment apparatus required in optical lens systems.

An advantageous configuration of the invention consists in that the lateral distance between the circumferences of the core cross sections at the light exit locations is equal to zero or approximately equal to zero. Accordingly, the beams of the individual cores are advantageously fused into a common beam cross section of radiation output. The lateral distance between the core cross sections should correspond to the technologically feasible minimum. The core cross sections can be configured in a circular shape.

In a further advantageous arrangement of the invention, the outer contour of the cladding cross section is round and the cores are arranged in a radially symmetric manner with respect to the center of the cladding cross section. This is advantageous for the handling of the fiber-optic arrangement with respect to coupling the individual beams into and out of the associated light-conducting cores as well as in technical respects relating to the manufacture of the fiber-optic arrangement. In this way, three cores can advantageously be provided.

BRIEF DESCRIPTION OF THE DRAWINGS

The invention will be explained more fully hereinafter with reference to an embodiment example. In the drawings.

DESCRIPTION OF THE PREFERRED EMBODIMENTS

Figure 1:
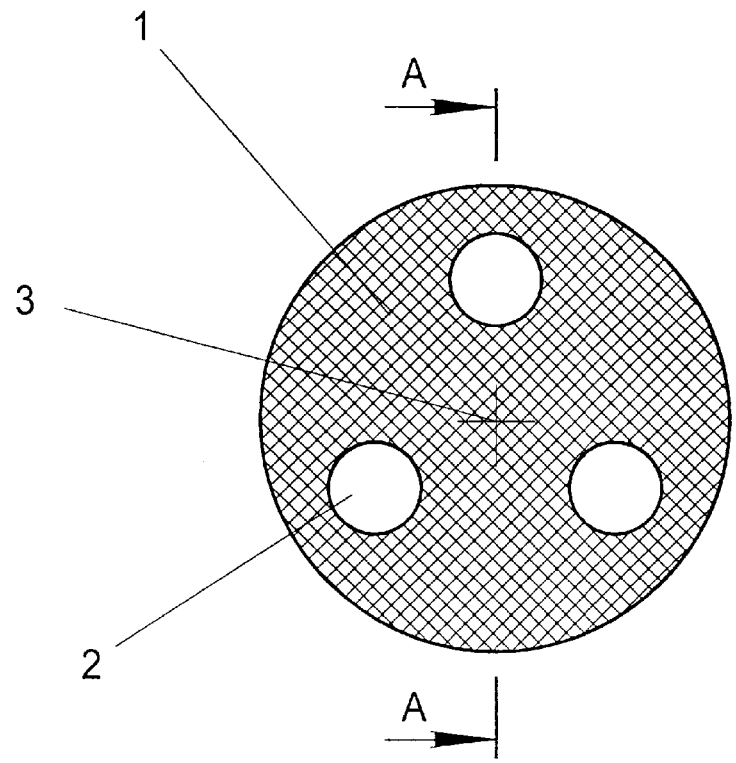
FIG. 1 is a cross section through the fiber-optic arrangement in the plane of the light entry locations.

FIG. 1 shows a fiber-optic arrangement in which three individual light-conducting cores 2 are enclosed by a common cladding 1. The cores 2 run alongside one another within the common cladding 2.

Figure 3:
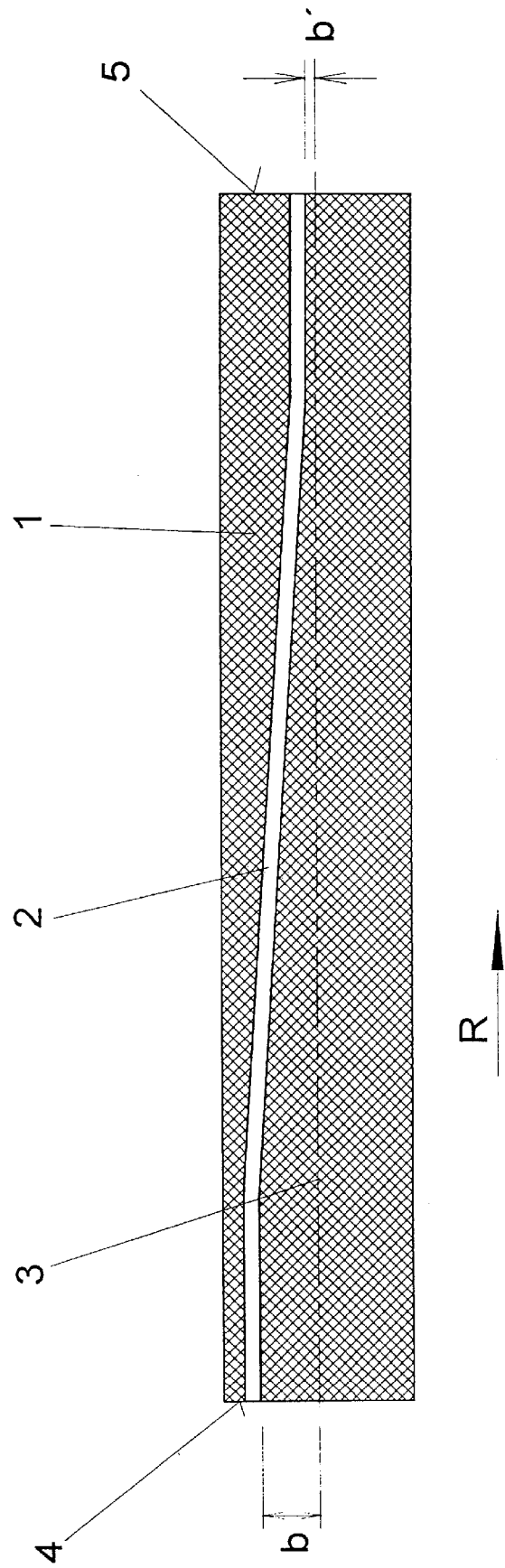
FIG. 3 is an example of the course of the cores within the common cladding.

FIG. 3 shows section A—A from FIG. 1 through the common cladding 1; only one of the cores 2 is shown in FIG. 3 due to the orientation of the sectional view. Each core 2 has a light entry location and a light exit location which correspond, respectively, to the end faces at the start and at the end of the respective core. The light entry locations of all cores 2 are arranged in a plane 4 which is oriented at a right angle to the propagation direction R of the light within the cores 2. The plane 4 at the same time terminates the fiber-optic arrangement at the end opposite the propagation direction R. The light exit locations of all cores 2 are provided at the opposite ends of the fiber-optic arrangement in a plane 5 which is likewise oriented at a right angle to the propagation direction R. It follows from this view, namely the arrangement of the light entry locations of the cores 2 in plane 4 and the arrangement of the light exit locations of all cores 2 in plane 5, that the propagation direction R of the light bundles is directed in the same direction in all of the cores 2.

Figure 2:
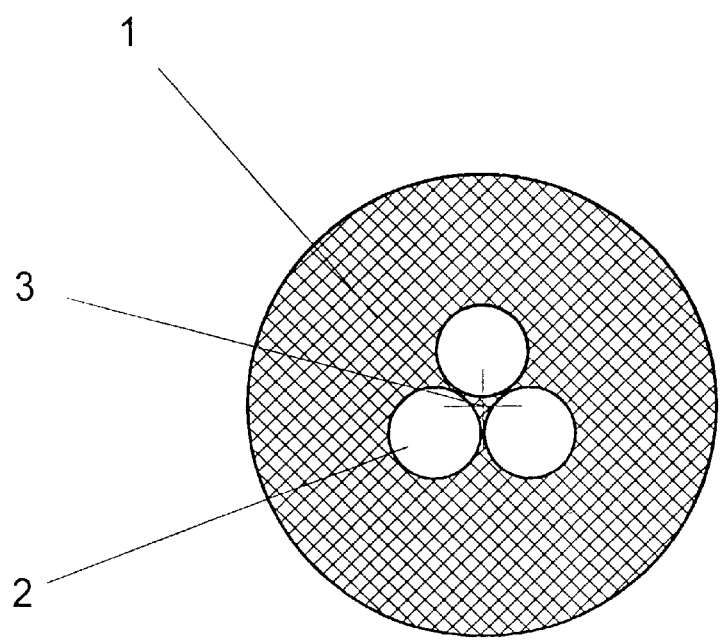
FIG. 2 is a cross section through the fiber-optic arrangement in the plane of the light exit locations.

FIG. 3 further shows that the lateral distance b of a core 2 from the center 3 of the common cladding 1 in plane 4, that is, at the position of the light inlet, is greater than the distance b' of the same core 2 from the center 3 in plane 5, i.e., at the light exit location. It follows that the lateral distance between every two cores 2 in plane 4 of the light inlet is greater than the distance between the same cores in plane 5 on the light outlet side. It is further clear from FIG. 2 that the distance between the circumferences of the core cross sections at the light exit location, that is, in plane 5, is equal to zero or at least approximately equal to zero. The cross sections of the cores 2 are round. The outer contour of the cladding cross section is likewise round. The cores 2 are arranged in a radially symmetric manner with respect to the center 3 of the cladding cross section.

While the foregoing description and drawings represent the preferred embodiments of the present invention, it will be obvious to those skilled in the art that various changes and modifications may be made therein without departing from the true spirit and scope of the present invention.
List of reference numbers

| | |
|---|---|
| 1 | cladding |
| 2 | cores |
| 3 | center |
| 4 | plane on the light inlet side |
| 5 | plane on the light outlet side |
| R | propagation direction |
| b | distance |
| b' | distance |

What is claimed is:

1. A fiber-optic arrangement for additive mixing of a plurality of light bundles, comprising:
    individual light-conducting cores for guiding laser light bundles independently and separately from one another, each of the cores having a light entry location and a light exit location;
    said light-conducting cores being enclosed by a common cladding and being arranged so as to run alongside one another within said cladding;
    propagation directions of the light bundles being identical in all cores;
    light exit locations of all cores being arranged in a common plane oriented at a right angle to the propagation direction, and
    lateral distance between every two cores at the light exit locations being smaller than the lateral distance between the same cores at the light entry locations,
    wherein the lateral distance between the circumferences of the core cross sections at the light exit locations is equal to zero or approximately equal to zero;
    the core cross sections are round; and
    the outer contour of the cladding cross section is round and the cores are arranged in a radially symmetric manner with respect to the center of the cladding cross section.

2. A fiber-optic arrangement for additive mixing of a plurality of light bundles, comprising:
    individual light-conducting cores for guiding laser light bundles independently and separately from one another, each of the cores having a light entry location and a light exit location;
    said light-conducting cores being enclosed by a common cladding and being arranged so as to run alongside one another within said cladding;
    propagation directions of the light bundles being identical in all cores;
    light exit locations of all cores being arranged in a common plane oriented at a right angle to the propagation direction, and
    lateral distance between every two cores at the light exit locations being smaller than the lateral distance between the same cores at the light entry locations,
    wherein the outer contour of the cladding cross section is round and the cores are arranged in a radially symmetric manner with respect to the center of the cladding cross section.

3. The fiber-optic arrangement according to claim 2, wherein the lateral distance between the circumferences of the core cross sections at the light exit locations is equal to zero or approximately equal to zero.

4. The fiber-optic arrangement according to claim 2, wherein the core cross sections are round.

5. The fiber-optic arrangement according to claim 1, wherein three cores are provided.

6. The fiber-optic arrangement according to claim 2, wherein three cores are provided.

* * * * *